US012737250B2

(12) United States Patent
Park

(10) Patent No.: US 12,737,250 B2
(45) Date of Patent: Sep. 15, 2026

(54) ELECTRONIC APPARATUS AND OPERATING METHOD THEREOF

(71) Applicant: SAMSUNG ELECTRONICS CO., LTD., Suwon-si (KR)

(72) Inventor: Dongwan Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/143,381

(22) Filed: May 4, 2023

(65) Prior Publication Data

US 2023/0305919 A1 Sep. 28, 2023

Related U.S. Application Data

(63) Continuation of application No. PCT/KR2022/020087, filed on Dec. 12, 2022.

(30) Foreign Application Priority Data

Feb. 4, 2022 (KR) ........................ 10-2022-0014931

(51) Int. Cl.

*G06F 11/00* (2006.01)
*G06F 8/65* (2018.01)
*G06F 11/07* (2006.01)

(52) U.S. Cl.

CPC ............ *G06F 11/0793* (2013.01); *G06F 8/65* (2013.01); *G06F 11/079* (2013.01)

(58) Field of Classification Search

CPC ............... G06F 11/0793; G06F 11/079; G06F 11/0766; G06F 11/302; G06F 8/65

See application file for complete search history.

(56) References Cited

U.S. PATENT DOCUMENTS 6,577,262 B1 6/2003 Veillette
10,162,693 B1 * 12/2018 Contino .............. G06F 11/0742

(Continued)

FOREIGN PATENT DOCUMENTS

CN 103458121 A 12/2013
CN 108021698 A 5/2018

(Continued)

OTHER PUBLICATIONS

International Search Report (PCT/ISA/210) issued from the International Searching Authority on Mar. 13, 2023 to International Application No. PCT/KR2022/020087.

(Continued)

*Primary Examiner* — Joseph D Manoskey
(74) *Attorney, Agent, or Firm* — Sughrue Mion, PLLC

(57) ABSTRACT

An electronic device includes a processor configured to: obtain error information based on an error that occurs in a first application being executed by the processor, identify a type of the error and a cause of the error at least based on the obtained error information, obtain a solution for solving the error from a reference data set by using the identified type of the error and the identified cause of the error, verify suitability of the obtained solution, based on state information of the electronic device, and provide a user with a guide to the obtained solution through the display based on the obtained solution that is verified to be suitable. The reference data set includes one or more error types, one or more error causes, and one or more error solutions.

12 Claims, 10 Drawing Sheets

(56) References Cited

U.S. PATENT DOCUMENTS

| | | | | |
|---|---|---|---|---|
| 10,185,308 | B2 | 1/2019 | Panther | |
| 11,106,524 | B1 * | 8/2021 | Csabi | G06F 11/0793 |
| 2012/0166874 | A1 * | 6/2012 | Bernardez | H04M 1/24 714/E11.029 |
| 2014/0289719 | A1 * | 9/2014 | Dewan | G06F 8/65 717/170 |
| 2017/0083399 | A1 * | 3/2017 | Smirnov | G06F 11/0778 |
| 2018/0246777 | A1 * | 8/2018 | Auvenshine | G06F 11/079 |
| 2019/0121717 | A1 * | 4/2019 | Francis | H04L 69/40 |
| 2019/0347149 | A1 * | 11/2019 | Panigrahi | G06F 16/24578 |
| 2019/0370105 | A1 | 12/2019 | Rau et al. | |
| 2020/0249938 | A1 * | 8/2020 | Shin | G06F 8/65 |
| 2022/0066860 | A1 * | 3/2022 | Sloane | G06F 16/2468 |
| 2022/0405159 | A1 * | 12/2022 | Joshi | G06F 11/0793 |
| 2024/0248832 | A1 * | 7/2024 | Fox | G06F 11/3664 |

FOREIGN PATENT DOCUMENTS

| | | | |
|---|---|---|---|
| CN | 110765007 | A | 2/2020 |
| JP | 2019-168877 | A | 10/2019 |
| JP | 2019-185626 | A | 10/2019 |
| KR | 10-2013-0065387 | A | 6/2013 |
| KR | 10-1338150 | B1 | 12/2013 |
| KR | 10-2014-0008201 | A | 1/2014 |
| KR | 10-2014-0055282 | A | 5/2014 |
| KR | 10-2018-0037342 | A | 4/2018 |
| RU | 2 639 683 | C2 | 12/2017 |
| WO | 97/01768 | A2 | 1/1997 |
| WO | 0068793 | A1 | 11/2000 |
| WO | 2010/120272 | A1 | 10/2010 |
| WO | 2017/057841 | A1 | 4/2017 |

OTHER PUBLICATIONS

European Extended Search Report issued Jan. 21, 2025 by the European Patent Office for EP Patent Application No. 22925114.5.

Communication issued Mar. 16, 2026 by the Intellectual Property of India in Indian Patent Application No. 202417058048.

Communication dated Feb. 17, 2026 issued by the Saudi Authority for Intellectual Property in Saudi Arabian Patent Application No. SA1120242982.

Communication dated Jul. 13, 2026, issued by Indian Patent Office in Indian Patent Application No. 202417058048.

Communication issued May 22, 2026 by the Russian Federal Service for Intellectual Property in Russian Patent Application No. 2024122000.

Communication dated Jun. 19, 2026 issued by the Intellectual Property India in Indian Patent Application No. 202417058048.

Communication dated Jun. 28, 2026 issued by the Korean Ministry of Intellectual Property in Korean Patent Application No. 10-2022-0014931.

Search Report dated Apr. 16, 2026, issued by the Intellectual Property Office of Singapore in Singapore Application No. 11202403241U.

Written Opinion dated May 1, 2026, issued by the Intellectual Property Office of Singapore in Singapore Application No. 11202403241U.

* cited by examiner

| | Number of provisions |
|---|---|
| Solution A | 10 |
| Solution B | 10 |
| Solution C | 5 |

Given order : A → B → C

Changed order : B → A → C

FIG. 11

| | Number of provisions |
|---|---|
| Solution A | 8 |
| Solution B | 6 |
| Solution C | 4 |

Given order : A → B → C

Changed order : C → A → B

FIG. 12

ELECTRONIC APPARATUS AND OPERATING METHOD THEREOF

CROSS-REFERENCE TO RELATED APPLICATIONS

This application is a continuation application of International Application No. PCT/KR2022/020087 designating the United States, filed on Dec. 12, 2022, in the Korean Intellectual Property Receiving Office and claiming priority to Korean Patent Application No. 10-2022-0014931, filed on Feb. 4, 2022, in the Korean Intellectual Property Office, the disclosures of which are incorporated by reference herein in their entireties.

BACKGROUND

1. Field

The disclosure relates to an electronic device (e.g., a smart phone) and one or more applications stored on the electronic device.

2. Description of Related Art

An electronic device may store one or more applications that a user may use. A crash may occur due to an error of an application being used by the user, and accordingly, the application being used may be forcibly terminated.

SUMMARY

When an application being used is forcibly terminated, a typical electronic device does not provide a solution, error information, and an error history and this may cause inconvenience to a user. One embodiment of the disclosure may provide an electronic device for analyzing an error cause (or a crash cause) of the application and providing a solution to the user.

One embodiment of the disclosure may provide the electronic device for providing the user with the error cause and error history of the application when a crash occurs and minimizing (or decreasing) the user's inconvenience. One embodiment of the disclosure may provide the electronic device for guiding to an update of the application to the user when an error of the application is not solvable. The technical goals to be achieved are not limited to those described above, and other technical goals not mentioned above are clearly understood by one of ordinary skill in the art from the following description.

According to an aspect of the disclosure, an electronic device includes: a display; a processor; and a memory operatively connected to the processor, wherein the memory stores one or more instructions that, when executed, cause the processor to be configured to: obtain error information based on an error that occurs in a first application being executed by the processor, identify a type of the error and a cause of the error at least based on the obtained error information, obtain a solution for solving the error from a reference data set by using the identified type of the error and the identified cause of the error, verify suitability of the obtained solution, based on state information of the electronic device, and provide a user with a guide to the obtained solution through the display based on the obtained solution that is verified to be suitable. The reference data set includes one or more error types, one or more error causes, and one or more error solutions.

According to another aspect of the disclosure, an electronic device includes: a display; a processor; and a memory operatively connected to the processor and configured to store a reference data set and one or more applications. The reference data set includes one or more error types, one or more error causes, and one or more error solutions. The memory stores one or more instructions that, when executed, cause the processor to be configured to: obtain error information based on an error that occurs in a first application being executed, determine whether the first application is a third-party application, based on the obtained error information, identify a type of the error and a cause of the error in the obtained error information based on a determination that the first application is the third-party application, obtain a solution for solving the error from the reference data set by using the identified type and the identified cause, verify suitability of the obtained error, based on state information of the electronic device, and display, on the display, a pop-up window for a guide to the obtained solution when the obtained solution is verified to be suitable.

According to another aspect of the disclosure, a method of an electronic device, includes: obtaining error information based on an error that occurs in a first application being executed; identifying a type of the error and a cause of the error in the obtained error information; obtaining a solution for solving the error from a reference data set by using the identified type and the identified cause; verifying suitability of the obtained solution, based on state information of the electronic device; and based on the obtained solution that is verified to be suitable, providing a user with a guide to the obtained solution through a display. The reference data set includes a plurality of error types, a plurality of error causes, and a plurality of solutions.

According to another aspect of the disclosure, an electronic device includes: a display; a processor; and a memory operatively connected to the processor. The memory stores one or more instructions that, when executed, cause the processor to operate to: obtain error information based on an error that occurs in a first application being executed by the processor; analyze state information of the electronic device for a time period between a first time instance and a second time instance that the error occurs in the first application, wherein the first time instance being a time instance earlier than the second time instance; determine a state of the electronic device based on the analyzed state information of the electronic device; determine an exception type or an error cause from the obtained error information; and obtain, from a data base, one or more solutions corresponding to the error, based on the determined state of the electronic device and based on at least one of (i) the determined exception type or (ii) the determined error cause.

In addition, various effects directly or indirectly ascertained through the present disclosure may be provided.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIGS. 11 and 12 are diagrams each illustrating an example of changing the order of solutions obtained by an electronic device, according to one embodiment.

DETAILED DESCRIPTION

Figure 1:
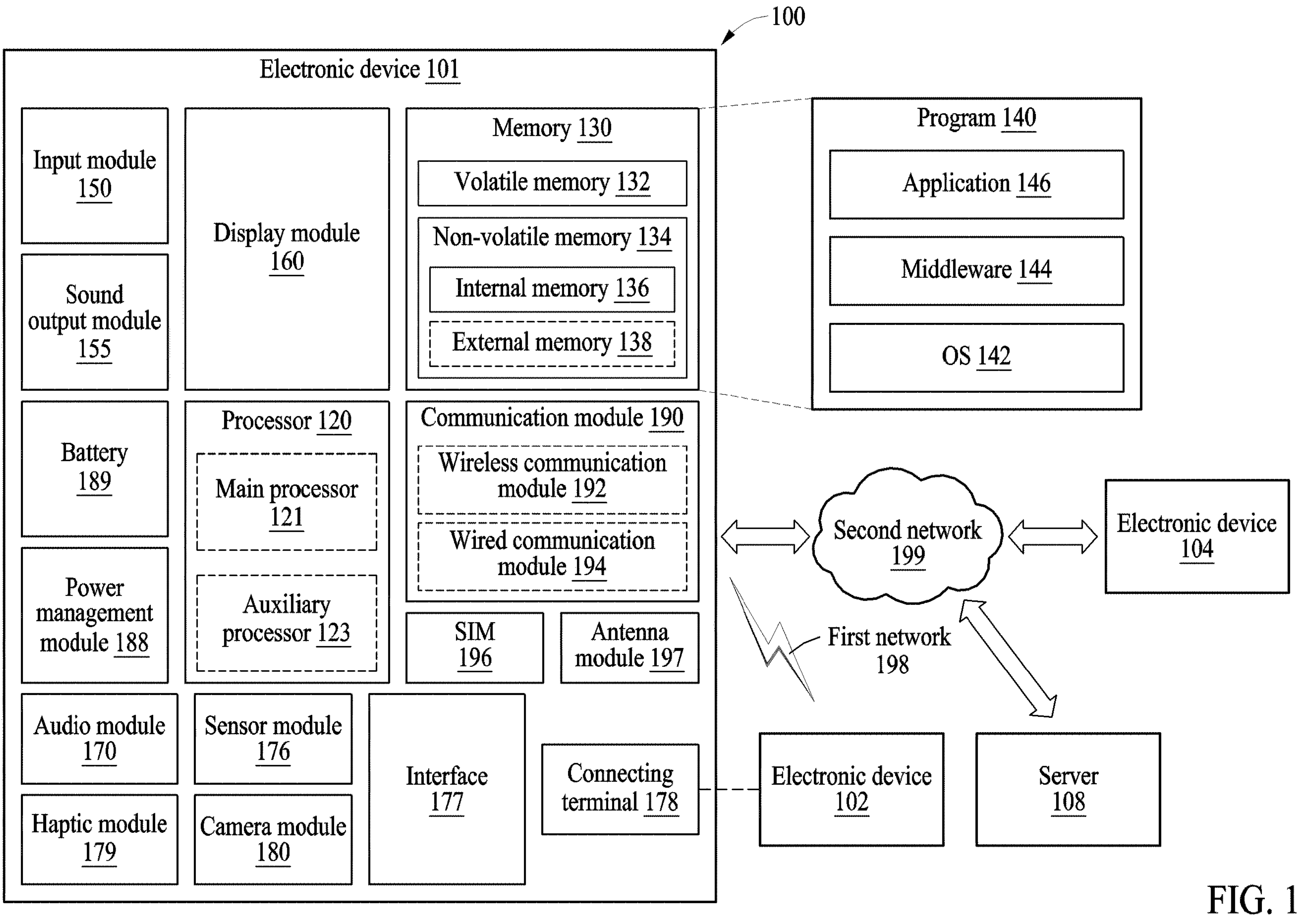
FIG. 1 is a block diagram illustrating an electronic device in a network environment, according to one embodiment.

Hereinafter, embodiments will be described in detail with reference to the accompanying drawings. When describing the embodiments with reference to the accompanying drawings, like reference numerals refer to like elements and a repeated description related thereto will be omitted.

FIG. 1 is a block diagram illustrating an electronic device 101 in a network environment 100 according to one embodiment. Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to one embodiment, the electronic device 101 may communicate with the electronic device 104 via the server 108. According to one embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the above components may be omitted from the electronic device 101, or one or more other components may be added to the electronic device 101. In some embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to one embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to one embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently from, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to one embodiment, the auxiliary processor 123 (e.g., an ISP or a CP) may be implemented as a portion of another component (e.g., the camera module 180 or the communication module 190) that is functionally related to the auxiliary processor 123. According to one embodiment, the auxiliary processor 123 (e.g., an NPU) may include a hardware structure specified for artificial intelligence (AI) model processing. An AI model may be generated through machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or a combination of two or more thereof, but is not limited thereto. The AI model may additionally or alternatively include a software structure other than the hardware structure.

The memory 130 may store various pieces of data used by at least one component (e.g., the processor 120 or the sensor module 176) of the electronic device 101. The various pieces of data may include, for example, software (e.g., the program 140) and input data or output data for a command related thereto. The memory 130 may include the volatile memory 132 or the non-volatile memory 134. The program 140 may be stored as software in the memory 130 and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to one embodiment, the receiver may be implemented separately from the speaker or as a part of the speaker.

The display module 160 may visually provide information to the outside (e.g., a user) of the electronic device 101. The display module 160 may include, for example, a display, a hologram device, or a projector and control circuitry to control a corresponding one of the display, the hologram device, and the projector. According to one embodiment, the display module 160 may include a touch sensor adapted to sense a touch, or a pressure sensor adapted to measure an intensity of a force incurred by the touch.

The audio module 170 may convert a sound into an electric signal and vice versa. According to one embodiment, the audio module 170 may obtain the sound via the input module 150 or output the sound via the sound output module 155 or an external electronic device (e.g., an electronic device 102 such as a speaker or headphones) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to one embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., by wire) or wirelessly. According to one embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to one embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to one embodiment, the haptic module 179 may include, for example, a motor, a piezoelectric element, or an electric stimulator.

The camera module 180 may capture a still image and moving images. According to one embodiment, the camera module 180 may include one or more lenses, image sensors, ISPs, or flashes.

The power management module 188 may manage power supplied to the electronic device 101. According to one embodiment, the power management module 188 may be implemented as, for example, at least a part of a power management integrated circuit (PMIC).

The battery 189 may supply power to at least one component of the electronic device 101. According to one embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., an AP) and that support a direct (e.g., wired) communication or a wireless communication. According to one embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to one embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., an external electronic device) of the electronic device 101. According to one embodiment, the antenna module 197 may include an antenna including a radiating element including a conductive material or a conductive pattern formed in or on a substrate (e.g., a printed circuit board (PCB)). According to one embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or power may be transmitted or received between the communication module 190 and the external electronic device via the at least one selected antenna. According to one embodiment, another component (e.g., a radio frequency integrated circuit (RFIC)) other than the radiating element may be additionally formed as a part of the antenna module 197.

According to one embodiment, the antenna module 197 may form a mmWave antenna module. According to one embodiment, the mmWave antenna module may include a PCB, an RFIC disposed on a first surface (e.g., a bottom surface) of the PCB or adjacent to the first surface and capable of supporting a designated a high-frequency band (e.g., a mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to one embodiment, commands or data may be transmitted or received between the electronic device 101 and the external electronic device 104 via the server 108 coupled with the second network 199. Each of the external electronic devices 102 and 104 may be a device of the same type as or a different type from the electronic device 101. According to one embodiment, all or some of operations to be executed by the electronic device 101 may be executed at one or more external electronic devices (e.g., the external electronic devices 102 and 104, and the server 108). For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, cloud computing, distributed computing, mobile edge computing (MEC), or client-server computing technology may be used, for example. The electronic device 101 may provide ultra low-latency services using, e.g., distributed computing or MEC. In one embodiment, the external electronic device 104 may include an Internet-of-things (IoT) device. The server 108 may be an intelligent server using machine learning and/or a neural network. According to one embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
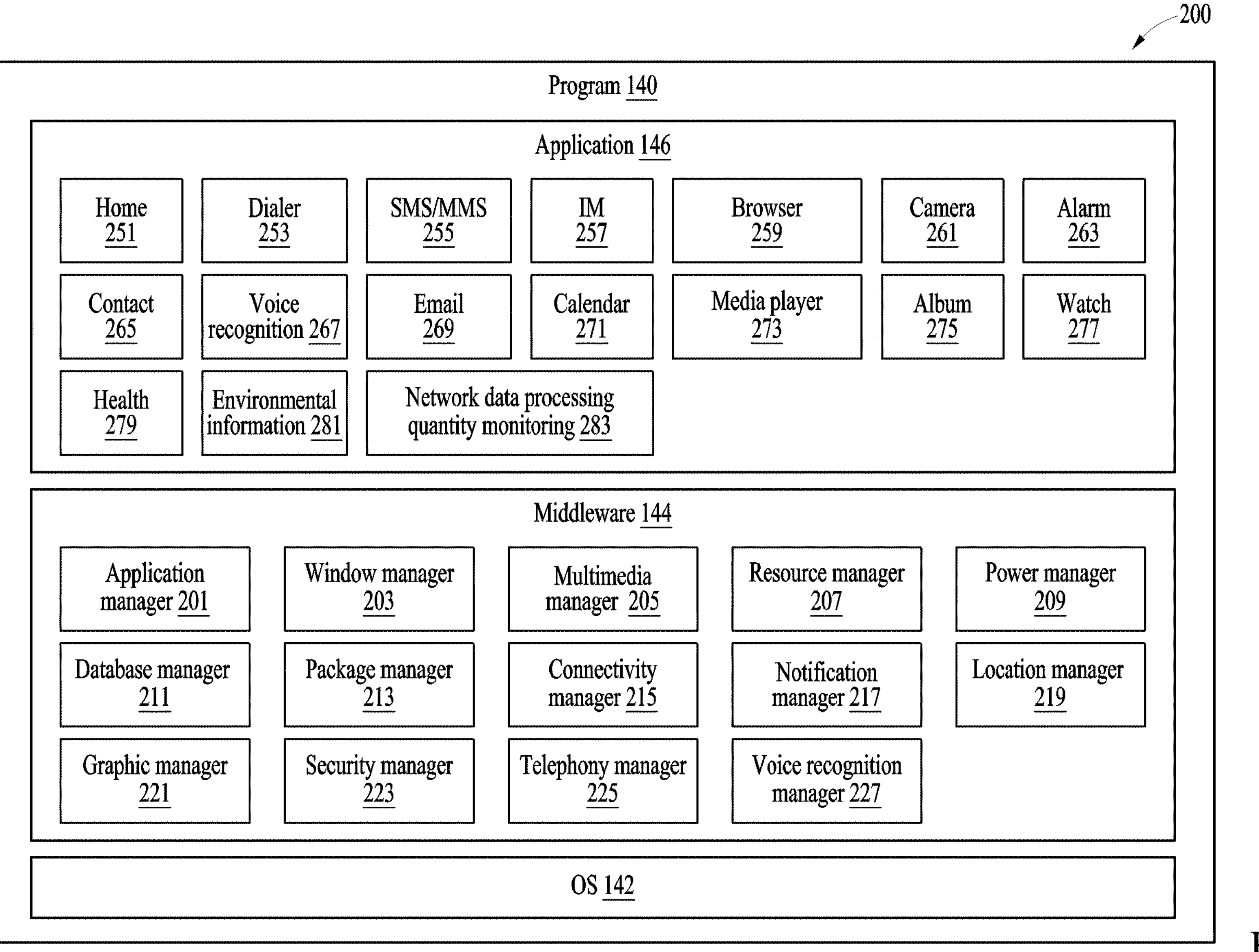
FIG. 2 is a block diagram illustrating a program according to one embodiment.

FIG. 2 is a block diagram 200 illustrating a program 140 according to one embodiment. According to one embodiment, the program 140 may include an OS 142 to control one or more resources of the electronic device 101, middleware 144, or an application 146 executable by the OS 142. The OS 142 may include, for example, Android™, iOS™, Windows™, Symbian™, Tizen™, or Bada™. At least some of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocation or deallocation) of one or more system resources (e.g., a process, a memory, or a power source) of the electronic device 101. The OS 142 may additionally or alternatively include one or more other driver programs to drive other hardware devices of the electronic device 101, for example, the input module 150, the sound output module 155, the display module 160, the audio module 170, the sensor module 176, the interface 177, the haptic module 179, the camera module 180, the power management module 188, the battery 189, the communication module 190, the SIM 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database (DB) manager 211, a package manager 213, a connectivity manager 215, a notification manager 217, a location manager 219, a graphic manager 221, a security manager 223, a telephony manager 225, or a voice recognition manager 227.

The application manager 201 may, for example, manage the life cycle of the application 146. The window manager 203, for example, may manage one or more graphical user interface (GUI) resources that are used on a screen. The multimedia manager 205, for example, may identify one or more formats to be used to play media files and may encode or decode a corresponding media file of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189 and may determine or provide related information to be used for the operation of the electronic device 101, based at least in part on corresponding information of the capacity, temperature, or power of the battery 189. According to one embodiment, the power manager 209 may interwork with a basic input/output system (BIOS) of the electronic device 101.

The DB manager 211, for example, may generate, search, or change a DB to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, a message, or an alert). The location manager 219, for example, may manage location information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108 and may receive, from the server 108, a command corresponding to a function to be executed by the electronic device 101, based at least in part on the voice data or text data converted based at least in part on the voice data. According to one embodiment, the middleware 144 may dynamically delete some existing components or add new components therefrom or thereto. According to one embodiment, at least some of the middleware 144 may be included as some of the OS 142 or may be implemented as another software separate from the OS 142.

The application 146 may include, for example, a home 251 application, a dialer application 253, a short message service (SMS)/multimedia messaging service (MMS) application 255, an instant message (IM) application 257, a browser application 259, a camera 261 application, an alarm application 263, a contacts application 265, a voice recognition application 267, an email application 269, a calendar application 271, a media player application 273, an album application 275, a watch application 277, a health application 279 (e.g., for measuring the degree of a workout or biometric information, such as blood sugar), or an environmental information application 281 (e.g., for measuring air pressure, humidity, or temperature information). According to one embodiment, the application 146 may further include an information exchange application for supporting information exchange between the electronic device 101 and the external electronic device. The information exchange application, for example, may include a notification relay application adapted to transfer designated information (e.g., a call, message, or alert) to the external electronic device, or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of an external electronic device that communicates with the electronic device 101, or some component (e.g., a display module or a camera module of the external electronic device) of the external electronic device. The device management application may additionally or alternatively support the installation, deletion, or update of an application being operated on an external electronic device.

The electronic device according to various example embodiments may be one of various types of electronic devices. The electronic device may include, for example, a portable communication device (e.g., a smartphone), a computer device, a portable multimedia device, a portable medical device, a camera, a wearable device, or a home appliance device. According to one embodiment of the disclosure, the electronic device is not limited to those described above.

It should be appreciated that embodiments of the disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things unless the relevant context clearly indicates otherwise. As used herein, "A or B," "at least one of A and B," "at least one of A or B," "A, B or C," "at least one of A, B and C," and "at least one of A, B, or C," each of which may include any one of the items listed together in the corresponding one of the phrases, or all possible combinations thereof. Terms such as "$1^{st}$," "$2^{nd}$," or "first" or "second" may simply be used to distinguish the component from other components in question, and do not limit the components in other aspects (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., by wire), wirelessly, or via a third element.

As used in connection with embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to one embodiment, the module may be implemented in a form of an application-specific integrated circuit (ASIC).

Embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium and execute it. This allows the machine to be operated to perform at least one function according to the at least one instruction invoked. The one or more instructions may include code generated by a compiler or code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method according to embodiments of the disclosure may be included and provided in a computer program product. The computer program product may be traded as a product between a seller and a buyer. The computer program product may be distributed in the form of a machine-readable storage medium (e.g., a compact disc read-only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as a memory of the manufacturer's server, a server of the application store, or a relay server.

According to embodiments, each component (e.g., a module or a program) of the above-described components may include a single entity or multiple entities, and some of the multiple entities may be separately disposed in different components. According to embodiments, one or more of the above-described components may be omitted, or one or more other components may be added. Alternatively or additionally, a plurality of components (e.g., modules or programs) may be integrated into a single component. In such a case, according to embodiments, the integrated component may still perform one or more functions of each of the plurality of components in the same or similar manner as they are performed by a corresponding one of the plurality of components before the integration. According to embodiments, operations performed by the module, the program, or another component may be carried out sequentially, in parallel, repeatedly, or heuristically, or one or more of the operations may be executed in a different order or omitted, or one or more other operations may be added.

Figure 3:
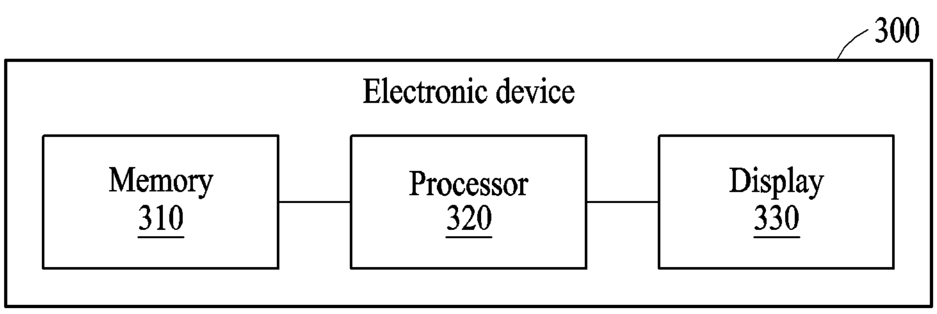
FIG. 3 is a block diagram illustrating an electronic device according to one embodiment.

FIG. 3 is a block diagram illustrating an electronic device according to one embodiment.

In one embodiment, an electronic device 300 (e.g., the electronic device 101 of FIG. 1) of FIG. 3 may include a memory 310 (e.g., the memory 130 of FIG. 1), a processor 320 (e.g., the processor 120 of FIG. 1), and a display 330 (e.g., the display module 160 of FIG. 1).

In one embodiment, the memory 310 may store one or more applications. For example, the memory 310 may store one or more third-party applications and one or more system applications. A system application may refer to an application installed in the electronic device 300 by a manufacturer of the electronic device 300. Although the system application may include, for example, a device care application for managing or caring for the electronic device 300, examples are not limited thereto.

In one embodiment, the processor 320 may obtain error information when an error occurs in a first application being executed. A crash may occur in the first application due to the error therein, and the first application being executed (or used) may be forcibly terminated. When the crash has occurred in the first application and the first application has been forcibly terminated, the processor 320 may obtain error information through a framework of an OS (e.g., the OS 142 of FIG. 2). The error information may include, for example, a process of the first application, an identification (ID) of the process of the first application, information of the first application, and crash information. Although the information of the first application may include, for example, the ID (e.g., a package name of the first application) of the first application and version information of the first application, examples are not limited thereto. Although the crash information may include, for example, a type of an error and a cause of the error (e.g., an exception) that has occurred, examples are not limited thereto. The exception may refer to, for example, an error that may be caused by an improper operation by a user or an error that may occur in a logic implemented by a developer. An example of the crash information is in Table 1.

TABLE 1

```
11-22 23:36:40.280 10360 14073 14073 E AndroidRuntime: FATAL
EXCEPTION: main
11-22 23:36:40.280 10360 14073 14073 E AndroidRuntime: Process:
com.???.katana, PID: 14073
11-22 23:36:40.280 10360 14073 14073 E AndroidRuntime:
android.util.AndroidRuntimeException:
java.lang.reflect.InvocationTargetException
...........................................
11-22 23:36:40.280 10360 14073 14073 E AndroidRuntime: Caused by:
java.lang.reflect.InvocationTargetException
...........................................
11-22 23:36:40.280 10360 14073 14073 E AndroidRuntime: Caused by:
java.lang.RuntimeException: Package not found: com.google.android.webview
...........................................
11-22 23:36:40.280 10360 14073 14073 E AndroidRuntime:        ... 27 more
```

In one embodiment, the processor 320 may identify, from the obtained error information, a type (e.g., an exception type) and a cause of the error having occurred in the first application. In one embodiment, the processor 320 may identify, from the crash information, the type and the cause of the error. For example, the processor 320 may extract or parse "InvocationTargetException" after "java.lang" in the line "11-22 23:36:40.280 10360 14073 14073 E AndroidRuntime: Caused by: java.lang.reflect. InvocationTargetException" including "java.lang" from the crash information of Table 1. The processor 320 may identify, from the crash information of Table 1, that "InvocationTargetException" has occurred. The processor 320 may extract or parse "Package not found: com.google.android.webview" after "Caused by" in the line "11-22 23:36:40.280 10360 14073 14073 E AndroidRuntime: Caused by: java.lang. RuntimeException: Package not found: com.google.android.webview" including "Caused by" from the crash information of Table 1.

In one embodiment, the processor 320 may obtain the information of the first application or the process of the first application and the ID of the process of the first application from the crash information. For example, the processor 320 may extract or parse "Process: com.???.katana" and "PID: 14073" in the line "11-22 23:36:40.280 10360 14073 14073 E AndroidRuntime: Process: com.???.katana, PID: 14073" including "Process" from the crash information of Table 1. The extracted "Process: com.???.katana" may refer to the process of the first application, and the extracted "PID: 14073" may refer to the ID of the process of the first application.

In one embodiment, the processor 320 may analyze the error information and may identify that the error of the first application has occurred, for example, because the first application had failed to find a web-view.

In one embodiment, the processor 320 may obtain a solution for solving the error having occurred in the first application from a reference data set by using the identified type and the identified cause of the error. The reference data set may include, for example, one or more error types (e.g., one or more exception types), one or more error causes, and one or more solutions. Although the one or more solutions may include, for example, one or more of granting authority (e.g., granting an authority for reading and writing a file and granting an authority for using the Internet), clearing cache, securing memory storage, rebooting, and connecting to the Internet, examples are not limited thereto. The one or more error causes (or one or more error types) may be respectively mapped to the one or more solutions. In one embodiment, the processor 320 may check or determine whether an exception type (an error type) (e.g., InvocationTargetException) extracted (or parsed) from the crash information (e.g., the crash information of Table 1) is in the reference data set. When the extracted exception type is in the reference data set, the processor 320 may check or determine whether an error cause corresponding to an extracted cause (e.g., "Package not found: com.google.android.webview") is in the reference data set. When the error cause corresponding to the extracted cause is in the reference data set, the processor 320 may obtain, from the reference data set, a solution mapped to the extracted cause.

In one embodiment, the reference data set may be stored in the memory 310 or a server. In one embodiment, the reference data set may be recorded in a DB of a system application (e.g., the device care application) of the electronic device 300. In another embodiment, the reference data set may be recorded in a DB of the server.

In one embodiment, the crash information may not include an error cause. For example, some crash information may not include a line including "Caused by". The processor 320 may identify an error type (e.g., an exception type) in the crash information and may obtain one or more solutions from the reference data set by using the identified error type.

In one embodiment, the processor 320 may verify the suitability of the obtained solution. The processor 320 may verify the suitability of the obtained solution, based on state information (e.g., a memory state and a communication connection state of the electronic device 300) of the electronic device 300. For example, the processor 320 may obtain, from the reference data set, a solution for securing a storage space of the memory 310. When the memory 310 has a sufficient storage capacity, the processor 320 may determine the solution for securing a storage space of the memory 310 to be unsuitable. When the memory 310 does not have a sufficient storage capacity, the processor 320 may determine the solution for securing a storage space of the memory 310 to be suitable.

In one embodiment, when the obtained solution is verified to be suitable, the processor 320 may provide a user, through the display 330, with a guide to the obtained solution. The processor 320 may display, on the display 330, a pop-up window for the guide to the obtained solution.

In one embodiment, the processor 320 may obtain, from the reference data set, a plurality of solutions for solving the error of the first application. The obtained solutions may have a given order, and the processor 320 may select a top-ranking solution (a solution in a highest position in the given order) from among the obtained solutions. The processor 320 may verify the suitability of the top-ranking solution, and when the top-ranking solution is verified to be suitable, may provide the user, through the display 330, with a guide to the top-ranking solution. Even when the top-ranking solution is performed, the error of the first application may not be solved. The processor 320 may verify the suitability of a next-highest-ranking solution (a solution in a next-highest position in the given order), and when the next-highest-ranking solution is verified to be suitable, may provide the user, through the display 330, with a guide to the next-highest-ranking solution. In another embodiment, the processor 320 may change the given order of the obtained solutions, and changing orders is described below with reference to FIGS. 11 and 12.

In one embodiment, when obtaining, from the reference data set, the plurality of solutions for solving the error of the first application, the processor 320 may provide the user, through the display 330, with a list of the obtained solutions. In one embodiment, the processor 320 may summarize each of the obtained solutions, display, on the display 330, a list of the summarized obtained solutions, and provide the list to the user. The processor 320 may perform a solution selected by the user from among the solutions (or the solutions displayed on the display 330) provided to the user.

In one embodiment, the processor 320 may identify or check or determine a use state of the electronic device 300. For example, the processor 320 may identify or check or determine whether the OS of the electronic device 300 is updated to the latest version, data in another electronic device of the user is backed up (or synchronized) to the electronic device 300, or the electronic device 300 is a new product. When the error occurs in the first application, the processor 320 may use a first recommendation algorithm (e.g., collaborative filtering) such that the processor 320 may provide the user with an error solution suitable for the identified use state. For example, when the error occurs in the first application, the processor 320 may provide the user with one or more solutions for solving the error of the first application by applying the first recommendation algorithm to the identified use state.

In one embodiment, the processor 320 may record, in the memory 310 (or the server), errors having occurred in each of a plurality of applications and solutions respectively provided to solve the errors having occurred in each of the plurality of applications. In other words, the memory 310 (or the server) may record a history of providing solutions. When the error occurs in the first application, the processor 320 may use the history of providing solutions and a second recommendation algorithm (e.g., content-based filtering) such that the processor 320 may provide the user with a suitable error solution. For example, the processor 320 may provide the user with one or more solutions for solving the error of the first application by applying the second recommendation algorithm to the history of providing solutions.

In one embodiment, even when the obtained solution (or a plurality of the obtained solutions) is performed, the error of the first application may not be solved. In another embodiment, the processor 320 may inquire that the identified error type is in the reference data set and may obtain a response indicating that the identified error type is not in the reference data set. When the error of the first application is not solved or the response indicating that the identified error type is not in the reference data set is obtained, the processor 320 may determine whether an updated version of the first application is in an application market. When the updated version of the first application is in the application market, the processor 320 may provide the user, through the display 330, with a guide to an update of the first application or a guide to the updated version of the first application. The processor 320 may display, on the display 330, a pop-up window for the guide to the update of the first application or the guide to the updated version of the first application. When the updated version of the first application is not in the application market, the processor 320 may provide the user, through the display 330, with information on the error of the first application, and when there is a user input to the provided information, may display, on the display 330, a screen including an error occurrence history of the first application and a button for uninstalling the first application.

Figure 4:
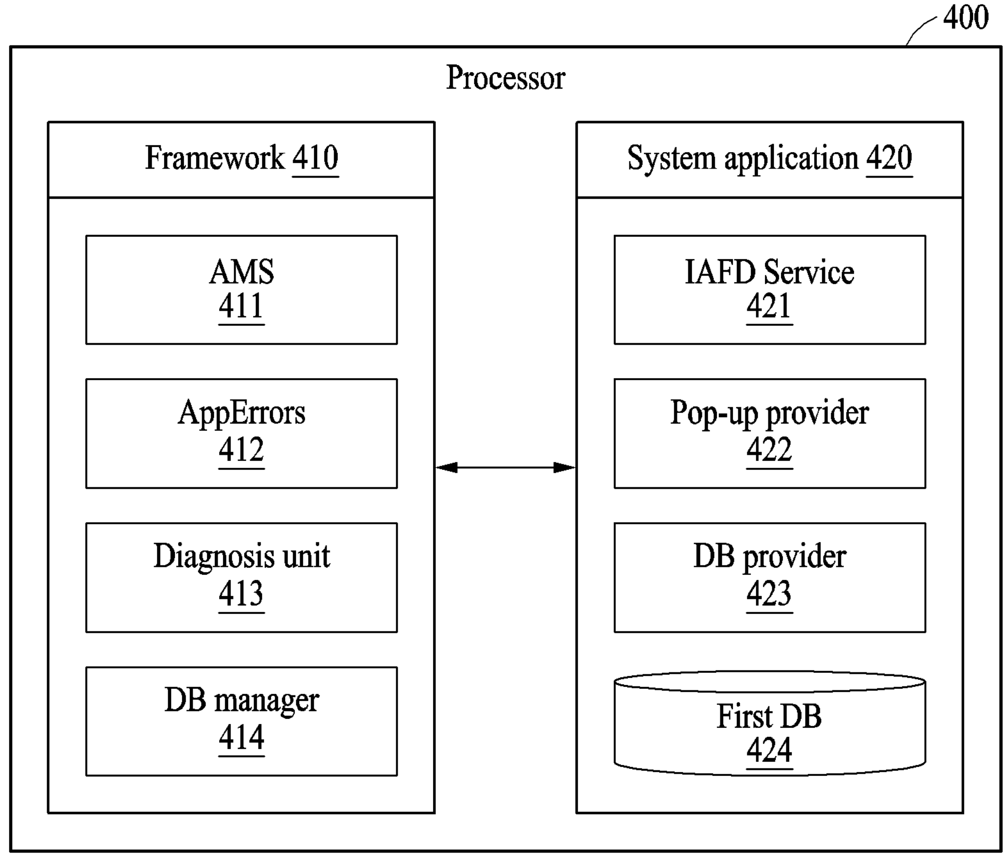
FIG. 4 is a diagram illustrating a framework of an operating system (OS) of an electronic device and a system application of the electronic device, according to one embodiment.

FIG. 4 is a diagram illustrating a framework of an OS of an electronic device and a system application of the electronic device, according to one embodiment. In one embodiment, a framework 410 of an OS and a system application 420 (e.g., the application 146 of FIG. 2) may operate in a processor 400 (e.g., the processor 320 of FIG. 3).

The framework 410 may include an activity manager service (AMS) 411 (e.g., the application manager 201 of FIG. 2), AppErrors 412, a diagnosis unit 413, and a DB manager 414 (e.g., the DB manager 211 of FIG. 2).

The system application 420 may include an intelligent application fault diagnosis (IAFD) service component 421 operating in the background, a pop-up provider 422 for providing a pop-up window, a DB provider 423 for connecting an external component (e.g., the framework 410) of the system application 420 to a first DB 424, and the first DB 424.

The first DB 424 may record the reference data set described with reference to FIG. 3. The first DB 424 may record version information of one or more applications.

In one embodiment, the processor 400 may inquire, through the framework 410, whether the first DB 424 in the system application 420 includes a solution for solving an error of a first application. The processor 400 may obtain, from the first DB 424, one or more solutions for solving the error of the first application.

In one embodiment, when a crash has occurred in the first application and the first application has been forcibly terminated, the processor 400 may obtain or collect error information through the AMS 411 of the framework 410.

In one embodiment, the processor 400 may operate the diagnosis unit 413 through the AppErrors 412. For example, the diagnosis unit 413 may correspond to an instance, and the processor 400 may generate, through the AppErrors 412, the instance corresponding to the diagnosis unit 413.

In one embodiment, the processor 400 may identify, through the diagnosis unit 413, an exception type and an error cause from crash information (e.g., the crash information of Table 1) in the error information.

In one embodiment, the processor 400 may perform, through the IAFD service component 421, some operations of the system application 420 in the background. Although the operations performed in the background may include, for example, an operation of accessing the first DB 424 and an operation of obtaining a solution from the first DB 424, examples are not limited thereto.

The processor 400 may access the first DB 424 through the DB manager 414 in the framework 410 and the DB provider 423 in the system application 420 and may inquire whether the first DB 424 includes a solution for the identified exception type and error cause. When the first DB 424 includes the solution for the identified exception type and error cause, the processor 400 may obtain the solution from the first DB 424 through the DB provider 423 and the DB manager 414.

In one embodiment, the processor 400 may verify the suitability of the obtained solution through the diagnosis unit 413, and when the obtained solution is verified to be suitable, may display, on the display 330 through the pop-up provider 422 of the system application 420, a pop-up window for a guide to the obtained solution.

In one embodiment, the number of times the obtained solution is provided may be recorded in the first DB 424. When providing the obtained solution to a user, the processor 400 may update the number, recorded in the first DB 424, of times the obtained solution is provided. For example, 10 (times) may be recorded in the first DB 424 as the number of times a solution A is provided. When providing the solution A to the user, the processor 400 may update the number of times the solution A is provided from 10 times to 11 times.

In one embodiment, when providing the obtained solution to the user, the processor 400 may record, in the first DB 424, providing the obtained solution in a current version of the first application. For example, a version of the first application in which an error has occurred may be 1.10 and the processor 400 may provide the solution A to the user. The processor 400 may record, in the first DB 424, that the processor 400 has provided the solution A to version 1.10 of the first application.

In one embodiment, the processor 400 may obtain solutions from the first DB 424 and may provide the user, through the display 330, with a list of the obtained solutions. In one embodiment, the processor 400 may summarize each of the obtained solutions, display, on the display 330, a list of the summarized obtained solutions, and provide the list to the user. The processor 400 may perform a solution selected by the user from among the solutions (or the solutions displayed on the display 330) provided to the user.

In one embodiment, the processor 400 may obtain, from the first DB 424, a response that there is no inquiry result. For example, when the identified exception type is not in the first DB 424, the processor 400 may obtain, from the first DB 424, the response that there is no inquiry result. The processor 400 may check or determine whether an updated version of the first application is in an application market. When the updated version of the first application is in the application market, the processor 400 may display, on the display 330, a pop-up window for a guide to an update of the first application or a guide to the updated version of the first application. When the updated version of the first application is not in the application market, the processor 400 may display, on the display 330, information on the error of the first application and provide the information to the user. When there is a user's input (hereinafter, referred to as user input) to the provided information, the processor 400 may display, on the display 330, a screen including an error occurrence history of the first application and a button for uninstalling the first application.

In one embodiment, the processor 400 may analyze state information of the electronic device 300 for a time period between a second time (instance) that the error occurs in the first application and a first time (instance). The first time (instance) may refer to a time (instance) earlier than the second time (instance) that the error occurs in the first application. Although the state information of the electronic device 300 may include, for example, one or more of a load state of the electronic device 300, a heat state of the electronic device 300, and an electromagnetic field state between the electronic device 300 and a base station, examples are not limited thereto. The error of the first application may be caused by an external factor (or a state of the electronic device 300), and the processor 400 may analyze, through the diagnosis unit 413, the state information of the electronic device 300 for the time period between the second time (instance) that the error occurs in the first application and the first time (instance). For example, multiple applications may be executed by the electronic device 300 and the processor 400 may be in a high load state, and because of the high load state of the processor 400, a temporary error may occur in the first application. In another example, heat (or a high temperature) of the electronic device 300 may temporarily degrade the performance of the processor 400, and the temporary degradation of the performance of the processor 400 may cause the error of the first application. Yet another example, the electromagnetic field state between the electronic device 300 and the base station may be a weak electromagnetic field state. When the electronic device 300 enters, for example, a bridge section or a tunnel section, the electromagnetic field state between the electronic device 300 and the base station may be a weak electromagnetic field state. The weak electromagnetic field state may cause a communication error of the electronic device 300 and/or an input/output error of the processor 400, which may cause the error of the first application.

In one embodiment, the processor 400 may check or determine a state of the electronic device 300, such as one or more of the load state, heat state, and electromagnetic field state of the electronic device 300 by analyzing the state information of the electronic device 300 for the time period between the second time (instance) that the error occurs in the first application and the first time (instance). When the electronic device 300 is in a high load state, a temperature of the electronic device 300 is high, and/or when the electronic device 300 is in a weak electromagnetic field state, the processor 400 may analyze or determine that the electronic device 300 is in an abnormal state.

In one embodiment, the processor 400 may identify or determine, through the diagnosis unit 413, the exception type and/or the error cause from the crash information and by using the identified exception type, the identified error cause, and/or an analysis result of the state information of the electronic device 300, may obtain one or more solutions for solving the error having occurred in the first application or obtain one or more solutions corresponding to the error having occurred in the first application. For example, the processor 400 may obtain, from the first DB 424, one or more solutions for the identified exception type and/or the identified error cause. The processor 400 may generate a method (e.g., stopping the execution of some applications when multiple applications are being executed and stopping the use of the electronic device 300 to decrease a temperature) of resolving (or alleviating) the abnormal state of the electronic device 300. One or more methods of resolving (or alleviating) the abnormal state of the electronic device 300 may be recorded in the first DB 424. When the electronic device 300 is in an abnormal state, the processor 400 may obtain, from the first DB 424, the one or more methods of resolving (or alleviating) the abnormal state of the electronic device 300.

Figure 5:
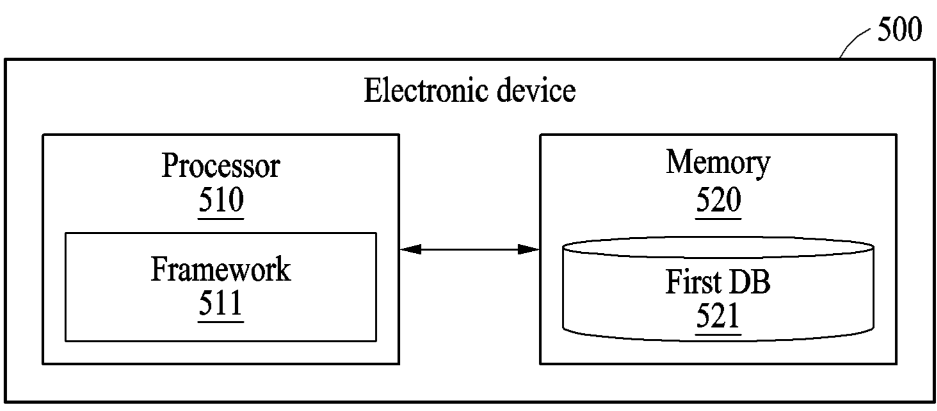
FIG. 5 is a diagram illustrating an example of obtaining an error-solving method from a database (DB) by an electronic device, according to one embodiment.

In one embodiment, the first DB 424 may be updated through an update of the system application 420. FIG. 5 is a diagram illustrating an example of obtaining an error-solving method from a DB by an electronic device, according to one embodiment.

In one embodiment, when a crash has occurred in a first application and the first application has been forcibly terminated, a processor 510 (e.g., the processor 320 of FIG. 3) in an electronic device 500 (e.g., the electronic device 300 of FIG. 3) of FIG. 5 may obtain error information through a framework 511 (e.g., the framework 410 of FIG. 4). The processor 510 may identify an exception type and an error cause from the error information obtained through the framework 511. In an example illustrated in FIG. 5, the processor 510 may not use a system application (e.g., the system application 420 of FIG. 4) to obtain a solution for the identified exception type and the identified error cause.

In one embodiment, the reference data set described with reference to FIG. 3 may be stored in a memory 520 (e.g., the memory 310 of FIG. 3). The reference data set may be recorded in a first DB 521 illustrated in FIG. 5.

In one embodiment, the processor 510 may inquire whether the first DB 521 includes a solution for the identified exception type and the identified error cause. When the solution for the identified exception type and the identified error cause is in the first DB 521, the processor 510 may obtain one or more solutions from the first DB 521.

In one embodiment, the processor 510 may verify the suitability of the obtained solution. When the obtained solution is verified to be suitable, the processor 510 may display, on the display 330 through the framework 511, a pop-up window for a guide to the obtained solution.

In one embodiment, the number of times the obtained solution is provided may be recorded in the first DB 521. When providing the obtained solution to a user, the processor 510 may update the number, recorded in the first DB 521, of providing the obtained solution. For example, 8 times may be recorded in the first DB 521 as the number of times a solution A is provided. When providing the solution A to the user, the processor 510 may update the number of times the solution A is provided from 8 times to 9 times.

In one embodiment, when providing the obtained solution to the user, the processor 510 may record, in the first DB 521, providing the obtained solution in a current version of the first application. For example, a version of the first application in which an error has occurred may be 2.10 and the processor 510 may provide the solution A to the user. The processor 510 may record, in the first DB 521, that the processor 510 has provided the solution A to version 2.10 of the first application.

In one embodiment, the processor 510 may obtain solutions from the first DB 521 and may provide the user, through the display 330, with a list of the obtained solutions. In one embodiment, the processor 510 may summarize each of the obtained solutions, display, on the display 330, a list of the summarized obtained solutions, and provide the list to the user. The processor 510 may perform a solution selected by the user from among the solutions (or the solutions displayed on the display 330) provided to the user.

In one embodiment, the processor 510 may receive, from the first DB 521, a response that there is no inquiry result. When receiving the response that there is no inquiry result, the processor 510 may check or determine whether an updated version of the first application is in an application market. When the updated version of the first application is in the application market, the processor 510 may display, on the display 330, a pop-up window for a guide to an update of the first application. When the updated version of the first application is not in the application market, the processor 510 may display, on the display 330, information on the error of the first application and provide the information to the user. When there is a user input to the provided information, the processor 510 may display, on the display 330, a screen including an error occurrence history of the first application and a soft button for uninstalling the first application.

In one embodiment, the processor 510 may analyze state information (e.g., a load state of the electronic device 500, a heat state of the electronic device 500, and an electromagnetic field state between the electronic device 500 and a base station) of the electronic device 500 for a time between a time when the error occurs in the first application and a first time. The examples of analyzing the state information of the electronic device 300 described with reference to FIG. 4 may apply to the examples of analyzing the state information of the electronic device 500, and thus, a detailed description is not repeated.

In one embodiment, the processor 510 may identify the exception type and the error cause from the crash information and by using the identified exception type, the identified error cause, and an analysis result of the state information of the electronic device 500, may obtain one or more solutions for solving the error having occurred in the first application. The examples of obtaining a solution by using the analysis result of the state information of the electronic device 300 described with reference to FIG. 4 may apply to the examples of obtaining a solution by using an analysis result of the state information of the electronic device 500, and thus, a detailed description is not repeated. In one embodiment, the first DB 521 may be updated through a firmware update (or an OS update).

Figure 6:
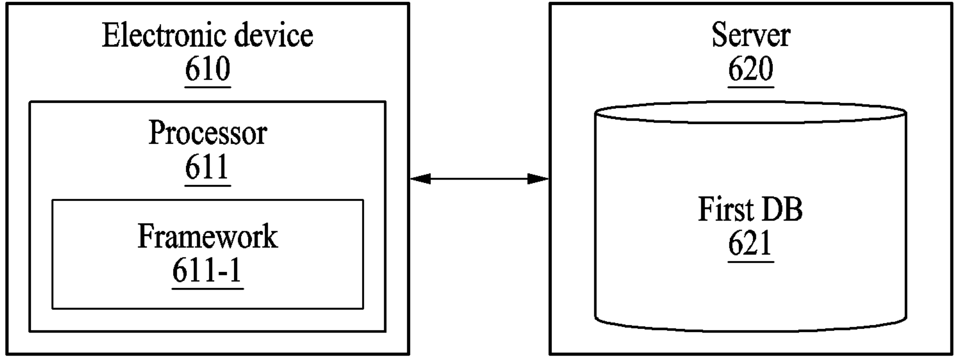
FIG. 6 is a diagram illustrating another example of obtaining an error-solving method from a DB by an electronic device, according to one embodiment.

FIG. 6 is a diagram illustrating another example of obtaining an error-solving method from a DB by an electronic device, according to one embodiment. In one embodiment, the reference data set described with reference to FIG. 3 may be stored in a server 620. The reference data set may be recorded in a first DB 621 of the server 620.

In one embodiment, when a crash has occurred in a first application and the first application has been forcibly terminated, a processor 611 (e.g., the processor 320 of FIG. 3) in an electronic device 610 (e.g., the electronic device 300 of FIG. 3) may obtain error information through a framework 611-1 (e.g., the framework 410 of FIG. 4). The processor 611 may identify an exception type and an error cause from the error information obtained through the framework 611-1.

In one embodiment, the processor 611 may transmit, to the server 620, information (e.g., a package name and version information of the first application) of the first application, the identified exception type, and the identified error cause through a communication module (e.g., the communication module 190 of FIG. 1) of the electronic device 610. The server 620 may check or determine whether a solution for a type of an exception having occurred in the first application and an error cause is in the first DB 621 in the server 620. When one or more solutions for the type of the exception having occurred in the first application and the error cause are in the first DB 621 in the server 620, the server 620 may transmit the one or more solutions to the electronic device 610.

In one embodiment, the processor 611 may verify the suitability of the received solutions, and when the received solutions are verified to be suitable, may display, on the display 330, a pop-up window for a guide to the received solutions.

In one embodiment, the number of times an obtained solution is provided may be recorded in the first DB 621. When providing the obtained solution to a user, the processor 611 may update the number, recorded in the first DB 621, of times the obtained solution is provided. For example, 5 times may be recorded in the first DB 621 as the number of times a solution A is provided. When providing the solution A to a user, the processor 611 may access the first DB 621 through the server 620 and may update the number of times the solution A is provided from 5 times to 6 times.

In one embodiment, when providing the obtained solution to the user, the processor 611 may record, in the first DB 621, providing the obtained solution in a current version of the first application. For example, a version of the first application in which an error has occurred may be 2.10 and the processor 611 may provide the solution A to the user. The processor 611 may access the first DB 621 through the server 620 and may record, in the first DB 621, that the processor 611 has provided the solution A to version 2.10 of the first application.

In one embodiment, the processor 611 may receive solutions from the server 620 and may provide the user, through the display 330, with a list of the received solutions. In one embodiment, the processor 611 may summarize each of the received solutions, display, on the display 330, a list of the summarized received solutions, and provide the list to the user. The processor 611 may perform a solution selected by the user from among the solutions (or the solutions displayed on the display 330) provided to the user.

In one embodiment, the processor 611 may receive, from the server 620, a response that there is no inquiry result. When receiving the response that there is no inquiry result, the processor 611 may check or determine whether an updated version of the first application is in an application market. When the updated version of the first application is in the application market, the processor 611 may display, on the display 330, a pop-up window for a guide to an update of the first application. When the updated version of the first application is not in the application market, the processor 611 may display, on the display 330, information on the error of the first application and provide the information to the user. When there is a user input to the provided information, the processor 611 may display, on the display 330, a screen including an error occurrence history of the first application and a soft button for uninstalling the first application.

In one embodiment, the processor 611 may analyze state information (e.g., a load state of the electronic device 610, a heat state of the electronic device 610, and an electromagnetic field state between the electronic device 610 and a base station) of the electronic device 610 for a time between a time when the error occurs in the first application and a first time. The examples of analyzing the state information of the electronic device 300 described with reference to FIG. 4 may apply to the examples of analyzing the state information of the electronic device 610, and thus, a detailed description is not repeated.

In one embodiment, the processor 611 may identify the exception type and the error cause from the crash information and by using the identified exception type, the identified error cause, and an analysis result of the state information of the electronic device 610, may obtain one or more solutions for solving the error having occurred in the first application. The examples of obtaining a solution by using the analysis result of the state information of the electronic device 300 described with reference to FIG. 4 may apply to the examples of obtaining a solution by using an analysis result of the state information of the electronic device 610, and thus, a detailed description is not repeated.

Figure 7:
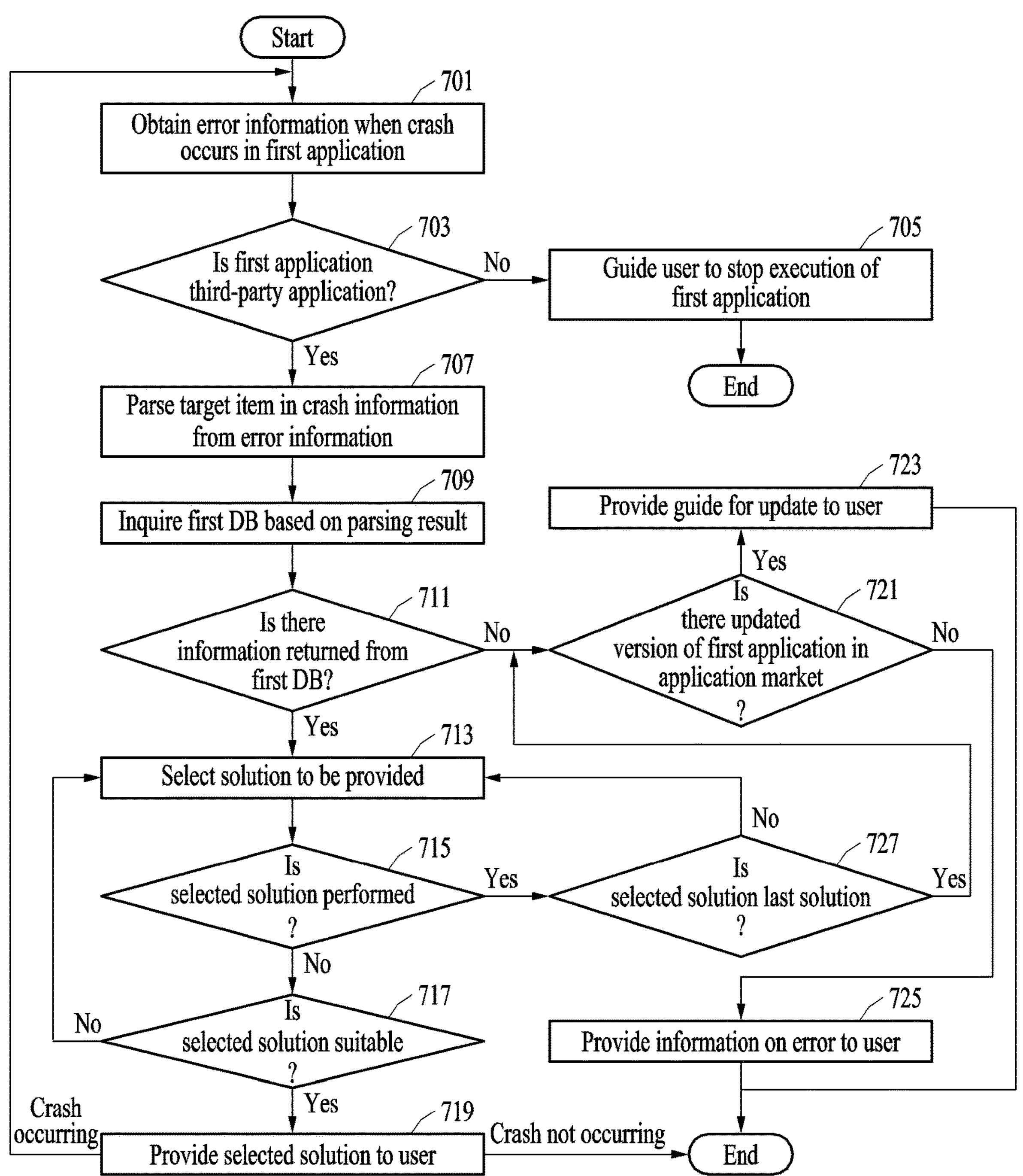
FIG. 7 is a flowchart illustrating an example of providing a solution when a crash occurs in an application of an electronic device, according to one embodiment.

FIG. 7 is a flowchart illustrating an example of providing a solution when a crash occurs in an application of an electronic device, according to one embodiment.

In operation 701, the electronic device (e.g., the electronic device 300 of FIG. 3) may obtain error information when a crash occurs in a first application. The obtained error information may include, for example, a process of the first application, an ID of the process of the first application, information of the first application, and crash information.

In operation 703, the electronic device 300 may check or determine whether the first application is a third-party application. In one embodiment, by using the error information (e.g., the information of the first application), the electronic device 300 may check or determine whether the first application is a third-party application.

When the first application is not a third-party application (operation 703—No), in operation 705, the electronic device 300 may guide a user to stop the execution of the first application. Operation 703 may be omitted according to embodiments.

When the first application is a third-party application (operation 703—Yes), in operation 707, the electronic device 300 may parse a target item (e.g., at least one of an exception type, an error cause, and the information of the first application) from the crash information in the error information.

In operation 709, based on a parsing result (e.g., at least one of the exception type, the error cause, and the information of the first application), the electronic device 300 may inquire a first DB (e.g., the first DB 424 of FIG. 4, the first DB 521 of FIG. 5, and the first DB 621 of FIG. 6). In one embodiment, the electronic device 300 may inquire whether a solution corresponding to the parsed target item is in a first DB.

In operation 711, the electronic device 300 may check or determine whether there is information (e.g., a solution for solving an error of the first application) that is returned (or obtained) from the first DB. For example, the electronic device 300 may receive information indicating that there is no inquiry result from the first DB when the parsed exception type is not in the first DB. In this case, the electronic device 300 may determine that there is no information returned from the first DB.

When there is no information returned from the first DB (operation 711—No), in operation 721, the electronic device 300 may check or determine whether an updated version of the first application is in an application market.

When the updated version of the first application is in the application market (operation 721—Yes), in operation 723, the electronic device 300 may provide a guide to an update of the first application to the user.

When the updated version of the first application is not in the application market (operation 721—No), in operation 725, the electronic device 300 may provide information on an error of the first application to the user. The electronic device 300 may display, on a display (e.g., the display 330 of FIG. 3), a screen including an error occurrence history of the first application and a button for uninstalling the first application.

The electronic device 300 may obtain, from the first DB, a plurality of solutions for solving the error having occurred in the first application (or a current version of the first application). When obtaining the plurality of solutions from the first DB and determining that there is information returned from the first DB (operation 711—Yes), in operation 713, the electronic device 300 may select a solution to be provided from among the obtained solutions. For example, the electronic device 300 may obtain, from the first DB, a solution #1 and a solution #2 for solving the error of the first application. Of the solution #1 and the solution #2, the solution #1 may be predetermined to be provided before the solution #2. Of the solution #1 and the solution #2, the solution #1 may have a higher priority than the solution #2. The electronic device 300 may select the solution #1 having the highest priority between the solution #1 and the solution #2. In one embodiment, the order of solutions may be changed, as described below with reference to FIGS. 11 and 12.

In operation 715, the electronic device 300 may determine whether the selected solution is performed. For example, a history that the electronic device 300 has provided the solution #1 to the user to solve the error of the first application may not be recorded in the first DB. The electronic device 300 may determine that the selected solution #1 has not been performed (operation 715—No), referring to the first DB.

When the selected solution #1 has not been performed (operation 715—No), in operation 717, the electronic device 300 may determine whether the selected solution #1 is suitable. The electronic device 300 may determine whether the selected solution #1 is suitable, based on state information (e.g., a memory state and a communication connection state) of the electronic device 300. When the selected solution #1 is not suitable (operation 717—No), in operation 713, the electronic device 300 may select the solution #2 and may determine whether the selected solution #2 is suitable.

When the selected solution #1 is suitable (operation 717—Yes), in operation 719, the electronic device 300 may provide the selected solution #1 to the user. When providing the selected solution #1 to the user, the electronic device 300 may update the number of times the selected solution #1 is provided in the first DB and may record, in the first DB, that the selected solution #1 is provided to the current version of the first application.

Even when the selected solution #1 is performed, the crash of the first application may occur again. When the crash of the first application occurs again, the electronic device 300 may perform operations 701, 703, 707, 709, and 713, again. When the crash of the first application occurs again, in operation 709, the electronic device 300 may reobtain the solution #1 and the solution #2 from the first DB. In operation 713, the electronic device 300 may select the solution #1 having the highest priority between the solution #1 and the solution #2.

In operation 715, the electronic device 300 may determine whether the selected solution #1 is performed. The history that the electronic device 300 has provided the solution #1 to the user to solve the error of the first application may be recorded in the first DB, and thus, the electronic device 300 may determine that the selected solution #1 is performed. When the selected solution #1 is performed (operation 715—Yes), in operation 727, the electronic device 300 may determine whether the selected solution #1 is the last solution. Because the solution #2 is left, the electronic device 300 may determine that the selected solution #1 is not the last solution (operation 727—No) and may select the solution #2, that is, the next solution, in operation 713.

In operation 715, the electronic device 300 may determine whether the selected solution #2 is performed. A history that the electronic device 300 has provided the solution #2 to the user to solve the error of the first application may not be recorded in the first DB, and thus, the electronic device 300 may determine that the selected solution #2 is not performed.

When the selected solution #2 has not been performed (operation 715—No), the electronic device 300 may determine whether the selected solution #2 is suitable. The electronic device 300 may determine whether the selected solution #2 is suitable, based on the state information (e.g., the memory state and the communication connection state) of the electronic device 300.

When the selected solution #2 is suitable (operation 717—Yes), in operation 719, the electronic device 300 may provide the selected solution #2 to the user. When providing the selected solution #2 to the user, the electronic device 300 may update the number of times the selected solution #2 is provided in the first DB and may record, in the first DB, that the selected solution #2 is provided to the current version of the first application.

Even when the selected solution #2 is performed, the crash of the first application may occur once again. When the crash of the first application occurs once again, the electronic device 300 may perform operations 701, 703, 707, 709, and 713, again. When the crash of the first application occurs once again, the electronic device 300, by performing operation 709, may reobtain the solution #1 and the solution #2 from the first DB. The electronic device 300 may select, in operation 713, the solution #1 having the highest priority between the solution #1 and the solution #2 and may determine, in operation 715, whether the selected solution #1 is performed. Because the selected solution #1 has been performed (operation 715—No), in operation 727, the electronic device 300 may determine whether the selected solution #1 is the last one. Because the selected solution #1 may rank top, the electronic device 300 may determine that the selected solution #1 is not the last solution (operation 727—No) and may select the solution #2, that is, the next-highest-ranking solution, in operation 713. In operation 715, the electronic device 300 may determine whether the selected solution #2 is performed. Because the selected solution #2 has been performed (operation 715—Yes), in operation 727, the electronic device 300 may determine whether the selected solution #2 is the last solution. The selected solution #2 may be the last solution (operation 727—Yes), and thus, the electronic device 300 may perform operation 721. When the updated version of the first application is in the application market (operation 721—Yes), the electronic device 300 may perform operation 723, and when the updated version of the first application is not in the application market (operation 721—No), the electronic device may perform operation 725. The description provided with reference to FIGS. 1 to 6 may also apply to the description of FIG. 7, and thus, a detailed description thereof is omitted.

Figure 8:
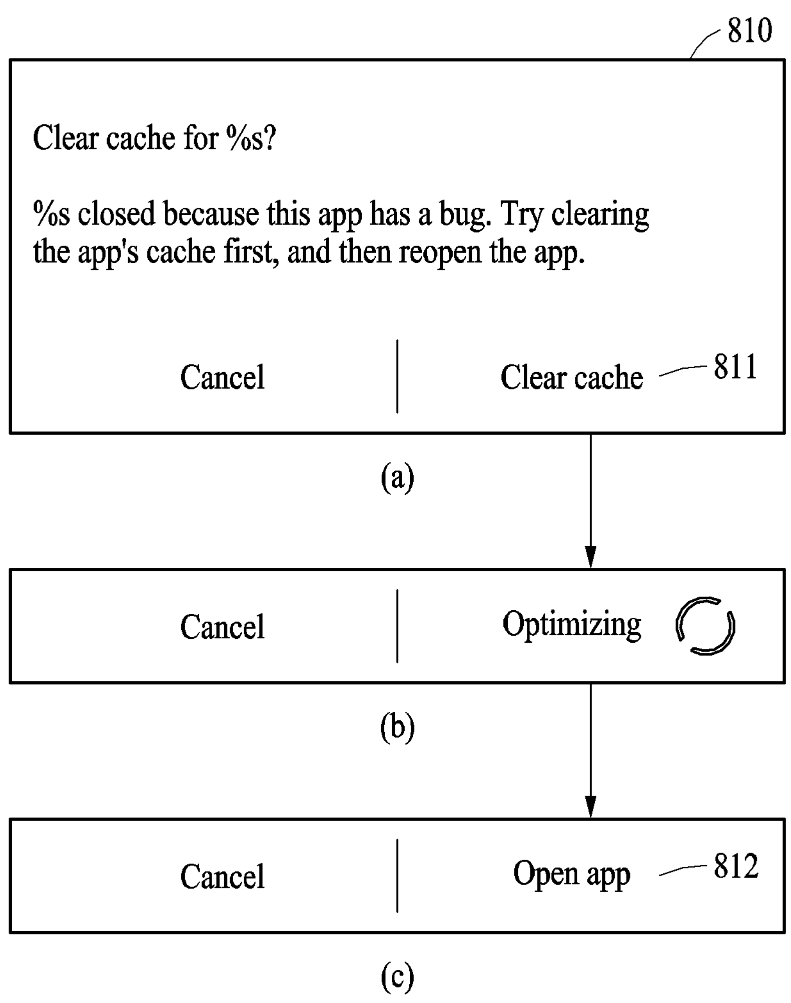
FIGS. 8, 9, and 10 are diagrams each illustrating a pop-up window of an electronic device, according to one embodiment.
Figure 9:
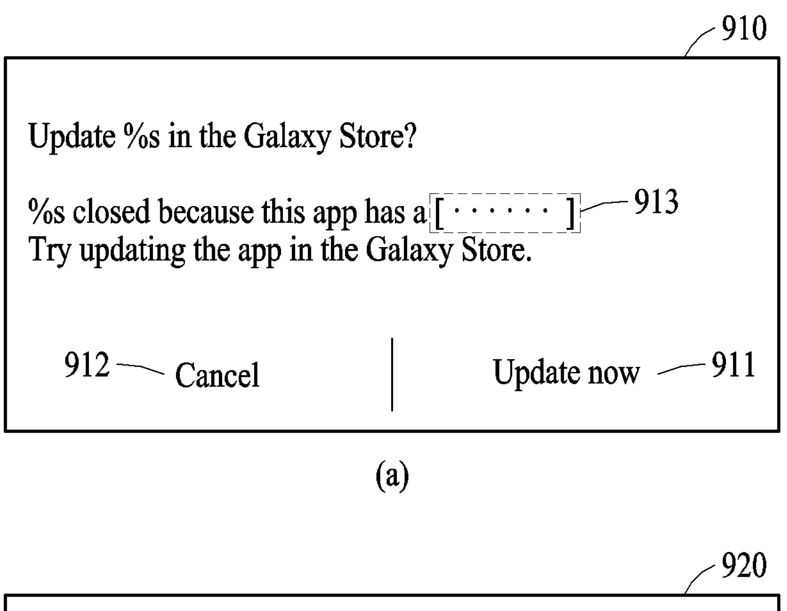
Figure 10:
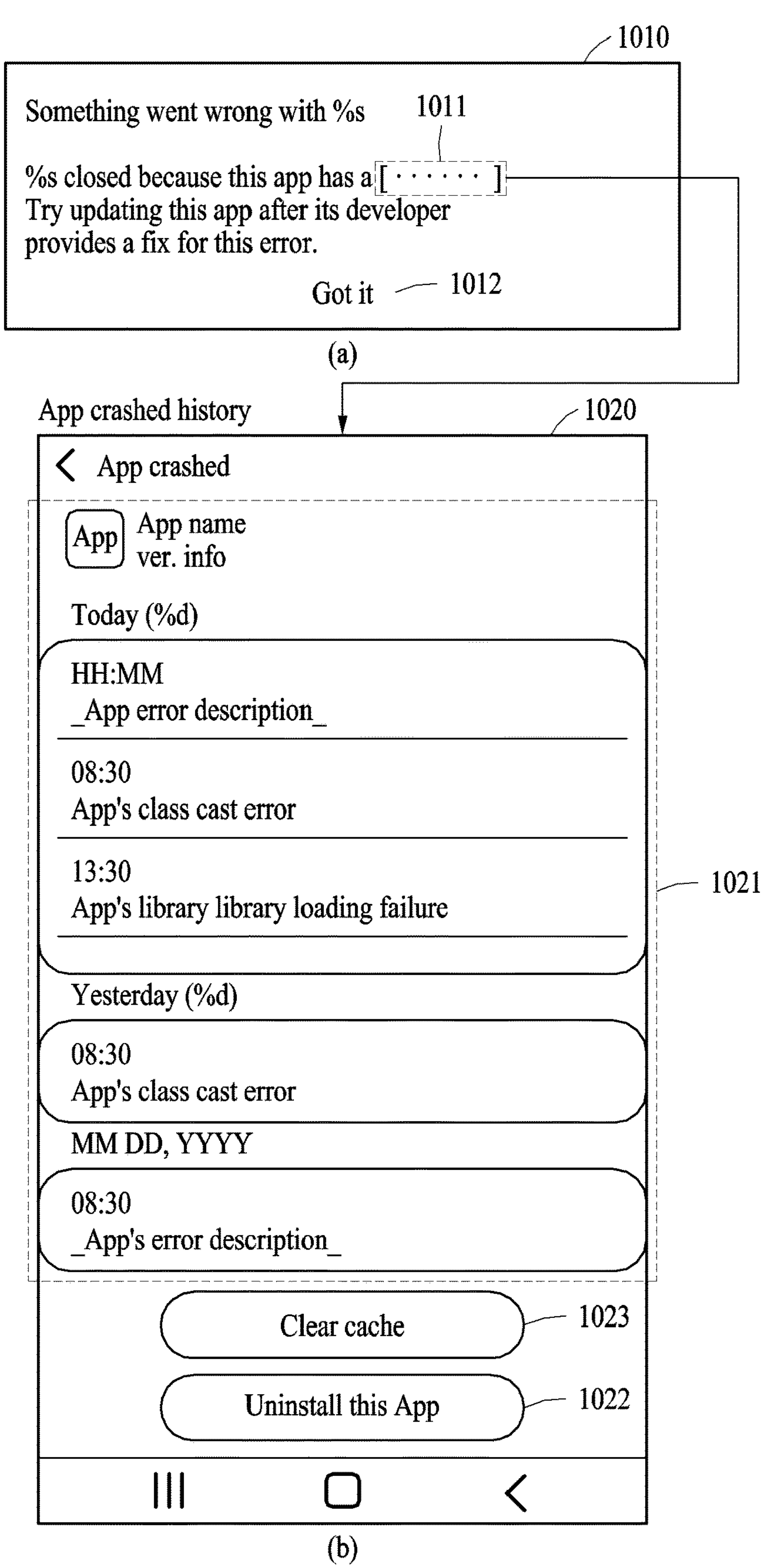

FIGS. 8, 9, and 10 are diagrams each illustrating a pop-up window of an electronic device, according to one embodiment. Referring to FIGS. 8, 9, and 10, "% s" may represent a name of a first application in which an error occurs.

In the example illustrated in FIG. 8, an electronic device (e.g., the electronic device 300 of FIG. 3) may obtain error information when the error of the first application occurs. The electronic device 300 may extract a first exception type (e.g., FileNotFoundException) from the error information. The electronic device 300 may inquire whether a solution for the first exception type is in a first DB (e.g., the first DB 424 of FIG. 4, the first DB 521 of FIG. 5, or the first DB 621 of FIG. 6) and may obtain a solution for clearing cache from the first DB.

In one embodiment, the electronic device 300 may provide a user with a solution for clearing cache. For example, as illustrated in FIG. 8 (box "(a)"), the electronic device 300 may display, on a display (e.g., the display 330 of FIG. 3), a pop-up window 810 for a guide to the solution for clearing cache. When there is a user input (e.g., a touch input) to a clear cache button 811 of the pop-up window 810, the electronic device 300 may display, on the display 330, visual feedback indicating that cache is being cleared as illustrated in FIG. 8 (box "(b)"). When the cache is cleared, the electronic device 300 may display an open app button 812 on the display 330 as illustrated in FIG. 8 (box "(c)"). The electronic device 300 may execute the first application when there is a user input to the open app button 812.

In one embodiment, in the example illustrated in FIG. 9, the electronic device 300 may provide the user with a guide to an update of the first application in which a crash occurs. For example, when there is no information returned from the first DB or when the error of the first application is not solved, the electronic device 300 may determine whether an updated version of the first application is in an application market. When the updated version of the first application is in the application market, the electronic device 300 may display, on the display 330, a pop-up window 910 for a guide to the update of the first application as illustrated in FIG. 9.

In one embodiment, the pop-up window 910 illustrated in FIG. 9 may include an update button 911, a cancel button 912, and information 913 on the error occurring in the first application. When there is a user input to the update button 911, the electronic device 300 may update the first application. When there is a user input to the cancel button 912, the electronic device 300 may display, on the display 330, a pop-up window 920 for another guide to the update of the first application.

In one embodiment, when the updated version of the first application is not in the application market, the electronic device 300 may display, on the display 330, a pop-up window 1010 for providing information 1011 on the error of the first application as illustrated in FIG. 10. When there is a user input to a got it button 1012 of the pop-up window 1010, the electronic device 300 may close the pop-up window 1010 from the display 330. When there is a user input to the information 1011 on the error of the first application, the electronic device 300 may display, on the display 330, a screen 1020 including an error occurrence history (e.g., a crash history 1021) of the first application and a button 1022 for uninstalling the first application as illustrated in FIG. 10 (*b*). The error occurrence history (e.g., the crash history 1021) may include, for example, a type of an exception having occurred and an error occurrence time. In the example illustrated in FIG. 10, the screen 1020 may further include a clear cache button 1023. However, the foregoing example is only an example, and the clear cache button 1023 may be excluded from the screen 1020.

FIGS. 11 and 12 are diagrams each illustrating an example of changing the order of solutions obtained by an electronic device, according to embodiments.

In one embodiment, when an error occurs in a first application, an electronic device (e.g., the electronic device 300 of FIG. 3) may obtain a plurality of solutions for solving the error from a first DB (e.g., the first DB 424 of FIG. 4, the first DB 521 of FIG. 5, or the first DB 621 of FIG. 6). For example, in the example illustrated in FIG. 11, the electronic device 300 may obtain a solution A, a solution B, and a solution C. A given order of the solutions A, B, and C may be, for example, A→B→C. Among the solutions A, B, and C, the solution A may be the highest, the solution B is the next-highest, and the solution C may be the last in the given order.

In one embodiment, among the obtained solutions, the electronic device 300 may calculate differences in numbers of provisions in multiple solutions in a successive order. For example, in the example illustrated in FIG. 11, the number of times that the solution A and the solution B are provided is 10 (times), and thus, the electronic device 300 may determine a difference, as 0, between the number of times that the solution A is provided (e.g., to the user through the display) and the number of times that the solution B is provided. The number of times that the solution B is provided is 10 (times) and the number of times that the solution C is provided is 5 (times). Thus, the electronic device 300 may determine a difference, as 5, between the number of times that the solution B is provided and the number of times that the solution C is provided.

In one embodiment, the electronic device 300, of the determined differences, when the difference between the number of times a next-highest solution is provided in the given order and the number of times a solution lower than the next-highest solution is provided in the given order is greater than or equal to a certain level, may change the given order such that the next-highest solution in the given order is the highest solution in the changed order. For example, in the example illustrated in FIG. 11, the difference of 5 between the number of times the solution B, that is, the next-highest solution, is provided and the number of times the solution C, that is, the solution lower than the next-highest solution, is provided may be greater than or equal to a certain level (e.g., 5), and thus, the electronic device 300 may change the given order A→B→C to B→A→C such that the solution B may rank top.

In one embodiment, the electronic device 300 may calculate differences between the number of provisions of solutions in a successive order among the obtained solutions and change the given order such that the lowest solution in the given order is the highest solution in the given order when the calculated differences are the same as each other. For example, in the example illustrated in FIG. 12, the electronic device 300 may calculate a difference, as 2, between the number of provisions of the solutions A and B, that is, the solutions, in a successive order, and may calculate a difference, as 2, between the number of provisions of the solutions B and C, that is, the solutions, in a successive order. The calculated differences may be the same as each other, and thus, the electronic device 300 may change the given order A→B→C to C→A→B such that the solution C, which is the lowest in the given order A→B→C, may be the highest in the changed order C→A→B.

In one embodiment, the electronic device 300 may apply a sorting algorithm to the number of time each of the obtained solutions is provided and change the given order of the obtained solutions. Although the sorting algorithm may include, for example, an ascending and/or descending order, examples are not limited thereto. For example, in the example illustrated in FIG. 12, the electronic device 300 may sort the solutions A, B, and C in each number of provisions thereof in an ascending order and change the given order A→B→C to C→B→A.

In one embodiment, the electronic device 300 may select the top-ranking solution in a changed order. In the example illustrated in FIG. 11, the electronic device 300 may select the solution B because the solution B may rank top in the changed order B→A→C. In the example illustrated in FIG. 12, the electronic device 300 may select the solution C because the solution C may rank top in the changed order C→A→B. The electronic device 300 may verify the suitability of the selected solution, and when the selected solution is verified to be suitable, may provide the selected solution to the user. When the selected solution is not verified to be suitable, the electronic device 300 may select the next-highest-ranking solution (e.g., the solution A in each changed order of FIGS. 11 and 12) in the changed order, may verify the suitability of the next-highest-ranking solution, and when the next-highest-ranking solution is suitable, may provide the next-highest-ranking solution to the user.

In one embodiment, when the given order of the solutions is changed, one of the solutions is performed, and the error of the first application is solved, the electronic device 300 may initialize the number of provisions of each of the solutions. For example, in the examples illustrated in FIGS. 11 and 12, the electronic device 300 may initialize the number of times that each of the solutions A, B, and C is provided to 0 times. When the same error having occurred in the first application occurs in a different application, the electronic device 300 may obtain the solutions A, B, and C from the first DB. The given order of the solutions A, B, and C may be A→B→C, and accordingly, the electronic device 300 may verify the suitability of the solution A first, and when the solution A is suitable, may provide the solution A to the user, first. In another example, the electronic device 300 may identify that the number of times the solution C is provided is the minimum among the number of times each of the solutions A, B, and C is provided. The electronic device 300 may change the given order from A→B→C to C→A→B, and may verify the suitability of the solution C first, and when the solution C is suitable, may provide the solution C to the user, first.

In one embodiment, the electronic device 300 may identify that an exception type "FileNotFoundException" has occurred, from error information, and an error cause has been failing to retrieve a file. The electronic device 300 may obtain the solutions A, B, and C from the first DB through the identified exception type and the identified error cause. Among the solutions A, B, and C, the solution B may be clearing cache and the solution C may be clearing a memory data area. The given order of the solutions A, B, and C may be, for example, A→B→C, and the given order of the solutions A, B, and C may be changed. Since the exception type having occurred is "FileNotFoundException", the solution C may be fixed to the last order. A data area of a memory (e.g., the memory 310 of FIG. 3) may include important data, and thus, the electronic device 300 may change the order of the solutions A and B without changing the order of the solution C.

Figure 13:
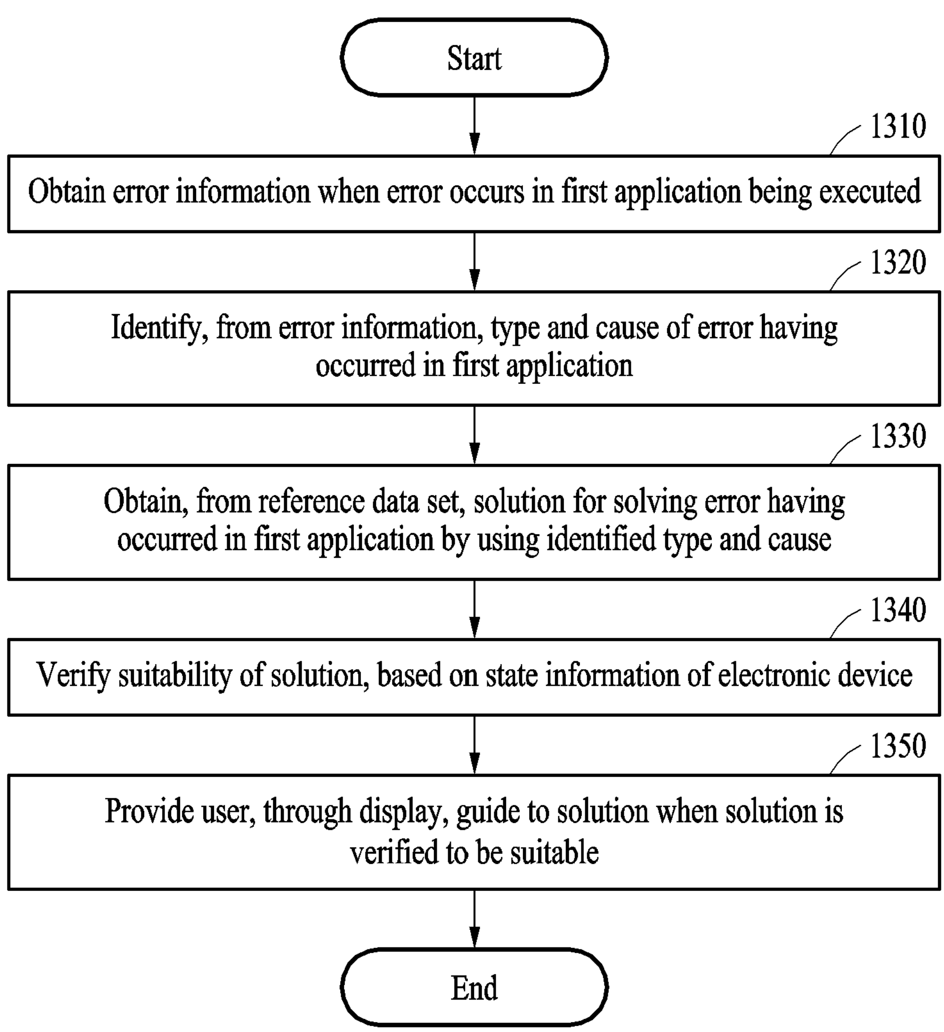
FIG. 13 is a flowchart illustrating an operating method of an electronic device, according to one embodiment.

FIG. 13 is a flowchart illustrating an operating method of an electronic device, according to one embodiment. The operating method illustrated in FIG. 13 may be performed by the electronic device (e.g., the electronic device 300 of FIG. 3).

In operation 1310, the electronic device 300 may obtain error information when an error occurs in a first application being executed.

In operation 1320, the electronic device 300 may identify, from the obtained error information, the type and cause of the error occurring in the first application.

In operation 1330, the electronic device 300 may obtain a solution for solving the error having occurred in the first application from a reference data set by using the identified type and cause of the error.

In operation 1340, the electronic device 300 may verify the suitability of the obtained solution, based on state information of the electronic device 300.

In operation 1350, when the obtained solution is verified to be suitable, the electronic device 300 may provide a user, through a display (e.g., the display 330 of FIG. 3), with a guide to the obtained solution.

The description provided with reference to FIGS. 1 to 12 may also apply to the description of FIG. 13, and thus, a detailed description thereof is omitted.

According to one embodiment, an electronic device (e.g., the electronic device 300 of FIG. 3) includes a memory (e.g., the memory 310 of FIG. 3) configured to store one or more applications, a display (e.g., the display 330 of FIG. 3), and a processor (e.g., the processor 320 of FIG. 3) configured to obtain error information when an error occurs in a first application being executed, identify a type and cause of the error in the obtained error information, obtain a solution for solving the error from a reference data set by using the identified type and cause of the error, verify suitability of the obtained solution, based on state information of the electronic device, and provide a user with a guide to the obtained solution through the display when the obtained solution is verified to be suitable, in which the reference data set includes one or more error types, one or more error causes, and one or more error solutions.

The reference data set may include one or more error types, one or more error causes, and one or more solutions.

When the error is not solved by the obtained solution, the processor may determine whether there is an updated version of the first application, and when there is the updated version of the first application, provide the user with a guide to an update of the first application through the display.

When there is no updated version of the first application, the processor may provide the user, through the display, with information (e.g., the information 1011 of FIG. 10) on the error, and when there is a user input to the provided information on the error, display, on the display, a screen (e.g., the screen 1020 of FIG. 10) including a history of the error and a button for uninstalling the first application.

When there is no error type corresponding to the identified type in the reference data set, the processor may determine whether there is an updated version of the first application, and when there is the updated version of the first application, provide the user with a guide to an update of the first application through the display.

When obtaining a plurality of solutions for solving the error from the reference data set by using the identified type and cause, the processor may select the highest solution in a given order of the obtained solutions, verify suitability of the selected solution, and when the selected solution is verified to be suitable, provide the user with a guide to the selected solution through the display.

When obtaining a plurality of solutions for solving the error from the reference data set by using the identified type and cause, the processor may change a given order of the obtained solutions, based on the number of time each of the obtained solutions is provided, select the highest solution in the changed order, verify suitability of the selected solution, and when the selected solution is verified to be suitable, provide the user with a guide to the selected solution through the display.

The processor may calculate differences between the number of provisions of solutions in a successive order among the obtained solutions and change (or arrange) the given order such that the lowest solution (e.g., the solution C of FIG. 12) in the given order is the highest solution in the given order when the calculated differences are the same as each other.

The processor, of the calculated differences, when the difference between the number of times a next-highest solution is provided (e.g., the solution B of FIG. 11) in the given order and the number of times a solution lower than the next-highest solution is provided in the given order is greater than or equal to a certain level, may change the given order such that the next-highest solution in the given order is the highest solution in the changed order.

When the given order is changed, the processor may initialize the number of times the obtained solutions are provided. When obtaining a plurality of solutions for solving the error from the reference data set by using the identified type and cause, the processor may provide the user through the display with a list of the obtained solutions and perform a solution selected by the user.

The reference data set may be stored in at least one of the memory and a server (e.g., the server 620 of FIG. 6). The processor may check or determine whether the first application is a third-party application, based on the obtained error information, and when the first application is the third-party application, identify the type and cause of the error, obtain the solution, verify the suitability of the obtained solution, and provide the user with the guide.

The processor may display, on the display, a pop-up window for the guide through a framework (e.g., the framework 410 of FIG. 4) of an OS or through a second application (e.g., the system application 420 of FIG. 4).

In one embodiment, an electronic device (e.g., the electronic device 300 of FIG. 3) includes a memory (e.g., the memory 310 of FIG. 3) configured to store a reference data set and one or more applications, in which the reference data set includes one or more error types, one or more error causes, and one or more error solutions, a display (e.g., the display 330 of FIG. 3), and a processor (e.g., the processor 320 of FIG. 3) configured to obtain error information when an error occurs in a first application being executed, check or determine whether the first application is a third-party application, based on the obtained error information, identify a type and cause of the error in the obtained error information when the first application is the third-party application, obtain a solution for solving the error from the reference data set by using the identified type and cause, verify suitability of the obtained error, based on state information of the electronic device, and display, on the display, a pop-up window for a guide to the obtained solution when the obtained solution is verified to be suitable.

When the error is not solved by the obtained solution, the processor may determine whether there is an updated version of the first application, and when there is the updated version of the first application, display, on the display, a pop-up window for a guide to an update of the first application.

When obtaining a plurality of solutions for solving the error from the reference data set by using the identified type and cause, the processor may select the highest solution in a given order of the obtained solutions, verify suitability of the selected solution, and when the selected solution is verified to be suitable, display, on the display, a pop-up window for a guide to the selected solution.

When obtaining a plurality of solutions for solving the error from the reference data set by using the identified type and cause, the processor may change (or arrange) a given order of the obtained solutions, based on the number of times each of the obtained solutions is provided, select the highest solution in the changed order, verify suitability of the selected solution, and when the selected solution is verified to be suitable, display, on the display, a pop-up window for a guide to the selected solution. The processor may display, on the display, the pop-up window for the guide through a framework of an OS or through a second application.

In one embodiment, an operating method of an electronic device (e.g., the electronic device 300 of FIG. 3) includes obtaining error information when an error occurs in a first application being executed, identifying a type and cause of the error in the obtained error information, obtaining a solution for solving the error from a reference data set by using the identified type and cause, verifying suitability of the obtained solution, based on state information of the electronic device, and when the obtained solution is verified to be suitable, providing a user with a guide to the obtained solution through a display, in which the reference data set includes a plurality of error types, a plurality of error causes, and a plurality of solutions.

The operating method of the electronic device may further include determining whether there is an updated version of the first application when the error is not solved by the obtained solution and providing the user through the display with a guide to an update of the first application when there is the updated version.

What is claimed is:

1. An electronic device comprising:

a display;

at least one processor including processing circuitry; and memory stores instructions, wherein the instructions, when executed by the at least one processor individually or collectively, cause the electronic device to:

obtain error information about a first application through a framework of an operating system (OS) of the electronic device, extract a type of an error from the obtained error information, based on the extracted type of the error, identify that a crash occurs in the first application, the crash indicating that the first application is forcibly terminated, based on the crash, determine whether an updated version of the first application is available in an application market, based on the updated version of the first application, which is available in the application market, provide, through the display, a user with a pop-up window, the pop-up window being for a first guide to install the updated version of the first application and informing the user that the crash has occurred in the first application, and after receiving a user input through the pop-up window, install the updated version of the first application for fixing the crash.

2. The electronic device of claim 1, wherein the instructions, when executed by the at least one processor individually or collectively, cause the electronic device to:

based on a determination that there is no updated version of the first application, provide the user, through the display, with information on the crash, and after receiving a second user input about the information on the crash, provide to the user, on the display, a history of the crash and a button for uninstalling the first application.

3. The electronic device of claim 1, wherein the instructions, when executed by the at least one processor individually or collectively, cause the electronic device to:

obtain a plurality of solutions for solving the crash from reference data set by using a cause of the crash, select a highest solution in a given order of the obtained solutions, verify suitability of the selected highest solution, and based on the selected highest solution that is verified to be suitable, provide the user with a second guide to the selected highest solution through the display.

4. The electronic device of claim 1, wherein the instructions, when executed by the at least one processor individually or collectively, cause the electronic device to:

identify a cause of the crash based on the error information, obtain a plurality of solutions for solving the crash from reference data set by using the cause of the crash, arrange a given order of the obtained solutions, based on numbers of times that the obtained solutions are provided, select a first solution in a highest position in the given order, verify suitability of the selected solution, and based on the selected solution that is verified to be suitable, provide the user with a guide to the selected solution through the display.

5. The electronic device of claim 4, wherein the instructions, when executed by the at least one processor individually or collectively, cause the electronic device to:

determine differences between the numbers of times that the obtained solutions are provided, and based on the determined differences between the numbers of times that the obtained solutions are provided, change the given order such that a second solution in a lowest position of the given order is moved to the highest position of the given order.

6. The electronic device of claim 5, wherein the instructions, when executed by the at least one processor individually or collectively, cause the electronic device to:

determine a difference between a first number of times that a first solution in a next-highest position in the given order is provided and a second number of times that a second solution, which is lower than the first solution, is provided in the given order is greater than or equal to a certain level, and based on the determined difference, change the given order such that the first solution in the next-highest position in the given order is moved to the highest position in the given order.

7. The electronic device of claim 4, wherein the instructions, when executed by the at least one processor individually or collectively, cause the electronic device to, based on the given order that is arranged, initialize the numbers of times that the obtained solutions are provided.

8. The electronic device of claim 1, wherein the instructions, when executed by the at least one processor individually or collectively, cause the electronic device to:

identify a cause of the crash based on the error information, obtain a plurality of solutions for solving the crash from reference data set by using the cause of the crash, provide the user through the display with a list of the obtained solutions, and perform a solution in the obtained solutions, which is selected by the user.

9. The electronic device of claim 1, wherein the instructions, when executed by the at least one processor individually or collectively, cause the electronic device to:

determine whether the first application is a third-party application, and based on a determination that the first application is the third-party application, identify a cause of the crash.

10. The electronic device of claim 1, wherein the at least one processor comprises an activity manager service (AMS), a diagnosis unit, a first data base (DB), a DB provider, a DB manager, and a pop-up provider; and wherein the instructions, when executed by the at least one processor, cause the electronic device to:

obtain, through the AMS, the error information, identify, through the diagnosis unit, the crash and a cause of the crash at least based on the obtained error information, obtain, from the first DB through the DB provider and the DB manager, a solution for solving the crash from a reference data set by using the identified cause of the crash, verify, through the diagnosis unit, suitability of the obtained solution, based on state information of the electronic device, and provide, through the pop-up provider, the user with a guide to the obtained solution through the display based on the obtained solution that is verified to be suitable, wherein the reference data set comprises one or more error types, one or more error causes, and one or more error solutions.

11. The electronic device of claim 10, wherein the instructions, when executed by the at least one processor individually or collectively, cause the electronic device to, based on a determination that there is no error type corresponding to an identified type in the reference data set, determine whether there is the updated version of the first application.

12. A method of an electronic device, the method comprising:

obtaining error information about a first application from a framework of an operating system (OS) of the electronic device;

extracting a type of an error from the obtained error information;

based on the extracted type of the error, identifying that a crash occurs in the first application, the crash indicating that the first application is forcibly terminated;

based on identifying the crash, determining whether an updated version of the first application is available in an application market;

based on the updated version of the first application, which is available in the application market, providing a user with a pop-up window, the pop-up window being for a first guide to an update of the first application through a display and informing the user that the crash has occurred in the first application; and, after receiving a user input through the pop-up window, installing the updated version of the first application for fixing the crash.

* * * * *